United States Patent Office 3,046,119

Patented July 24, 1962

3,046,119

LIGHT SENSITIVE MATERIAL FOR PRINTING AND PROCESS FOR MAKING PRINTING PLATES

Oskar Süs, Wiesbaden-Biebrich, Germany, assignor, by mesne assignments, to Azoplate Corporation, Murray Hill, N.J.

No Drawing. Filed Feb. 14, 1958, Ser. No. 715,223
Claims priority, application Germany Aug. 1, 1950
31 Claims. (Cl. 96—33)

The present invention relates to the production of light-sensitive materials suitable for use in the graphic art. More particularly, it relates to a positive working photo-mechanical method for the manufacture of lithographic printing plates and to light-sensitive material suitable therein.

In the U.S. patent application Serial No. 174,556, filed on July 18, 1950, by Maximilian Paul Schmidt and now abandoned, a process has been described for the production of images, in particular of printing plates, by means of diazo compounds, which calls for the following procedure: diazo compounds insoluble in water which are derived from 2-diazo-naphthol-(1)- or 1-diazo-naphthol-(2) and have the chemical constitution of esters or amides of a sulfo-acid or a carboxylic acid of these diazo naphthols are used to produce a light sensitive layer on a base material; this layer is then exposed to actinic light under a master pattern, and the image is developed with alkali and subsequently heated.

In the above cited patent application Serial No. 174,556 it has also been pointed out that it is possible to add resins or fatty acids to the diazo compounds or to apply such resins or fatty acids to the base material as an intermediate layer between the base and the light sensitive layer; the heating, furthermore, can be omitted and the process may also be carried out without the use of resins or fatty acids.

The U.S. patent applications Serial Nos. 202,403, filed December 22, 1950, and 208,055, filed January 26, 1951, both by Maximilian Paul Schmidt, all now abandoned, described the use of other groups of diazo compounds that are insoluble in water and belong to the category of orthoquinone diazides.

All the inventions covered by the above mentioned patent applications pertain to positive working processes or to the production of positives from positive master patterns or of negatives from negative master patterns.

It has now been found that diazo compounds which are derived from sulfonic acids of ortho-diazo-phenols of the benzene series also described in the literature as ortho-quinone-diazides (Beilstein, 4th edition, volume 16 (1933), page 520 and 522/23) and which have the constitution of esters of these acids are particularly well suited for making photosensitive material for the production of printing plates according to the same general method as described in the applications referred to above.

The invention is particularly concerned with the new diazo compounds having the general formula

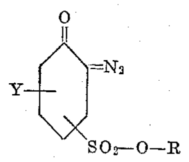

in which R is a radical having a ring structure, such as an aryl, substituted aryl, heterocyclic, or substituted heterocyclic radical, and Y is hydrogen or a lower alkyl radical. Of these, the diazo compounds derived from ortho-benzoquinone diazide-4-sulfonic acid are preferred for the production of printing plates.

A light sensitive layer of one of the new diazo compounds of the present invention, which are derived from ortho-quinone-diazides of the benzene series, may be prepared on a base in the manner described in the patent applications referred to above; e.g., the diazo compound may be dissolved in an organic solvent or in a mixture of several solvents and applied to a base material in known manner, for example, by whirl-coating, brushing or with the aid of rollers. Solvents with a boiling point between 70–100° are preferred. The solvents must have sufficient volatility, but on the other hand they must evaporate slowly enough to delay crystallization so that a uniform layer is formed on the base material. If the diazo compound has good general solubility, it will be easy to make a suitable selection from among the manifold solvents available. After coating, a thorough subsequent drying of the light-sensitive layer is advisable in order to remove the solvents entirely.

Sometimes the addition of resins to the coating solution is advisable in order to delay crystallization and/or to improve the adhesion of the light-sensitive layer to the base.

Metal plates or foils such as for example, those of aluminum and zinc are probably the best bases for these light-sensitive layers. It is not necessary to work with superficially oxidized metal foils which have been used in the graphic art for the production of flat-printing plates. Equally good results are obtained with metal foils having a mechanically roughened surface which may be produced by a simple process. Other base materials, as for example, glass or stone plates, may also be used.

After the sensitized base material has been exposed to a light image, it is developed by treating or wiping it with dilute, appropriately 1–5% solutions of preferably weak alkalies such as disodiumphosphate or trisodiumphosphate. After a subsequent treatment with dilute acid the material is made ready for printing. The diazo compound remains at those areas of the base which are not struck by light and accepts the greasy lithographic printing ink so that positive ink receptive images are obtained from positive masters. With the aid of the printing machines used in planographic printing a large number of copies can be made in accord with commercial practice. If the printing plates must be subjected to high mechanical strains the image should be burned in by a short heating of the plate in a drying oven at about 250° C. Thereby a much better adhesion of the printing image to the metallic support is obtained and the number of copies which can be made is increased.

The following table contains some of the diazo compounds which may be used according to the present invention; these compounds are given merely by way of example.

(1) Benzoquinone-(1,2)-diazide-(2) - 4 - sulfonic acid-phenyl-ester

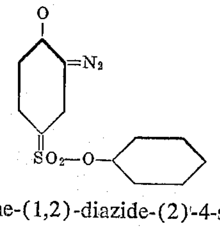

(2) Benzoquinone-(1,2)-diazide-(2)-4-sulfonic acid - β-naphthyl-ester

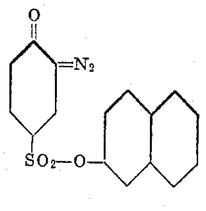

(3) O,O′-di-[benzoquinone-(1″,2″)-diazide-(2″)-4″-sulfonyl]-4,4′dihydroxy-diphenyl

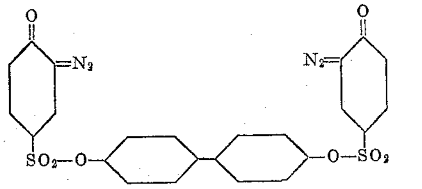

(4) O,O′-di-[5″-methyl-benzoquinone-(1″,2″)-diazide-(2″)-4″-sulfonyl]-4,4′-dihydroxy-diphenyl-sulfone

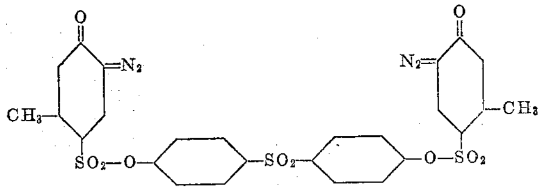

(5) O,O′-di-[benzoquinone-(1″,2″)-diazide-(2″)-4″-sulfonyl]-4,4′-dihydroxy-diphenyl-sulfone

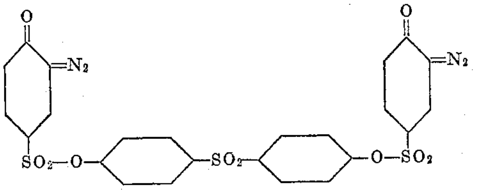

(6) O,O′-di-[benzoquinone-(1″,2″)-diazide-(2″)-4″-sulfonyl]-4,4′-dihydroxy-diphenyl-cyclohexane-(1‴,1‴)

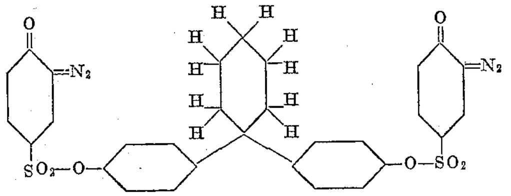

(7) O-[benzoquinone-(1′,2′)-diazide-(2′)-4′-sulfonyl]-3-hydroxy-diphenylenoxide

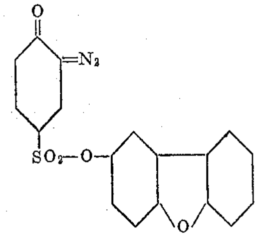

These diazo compounds are not described in the literature and the new diazo compounds in themselves form part of the present invention. They may be prepared for example by the following methods.

Diazo compounds with an esterified $SO_3H$-group are prepared from o-hydroxy-nitrobenzene-sulfonic acids by heating with phosphorus pentachloride to convert them into the o-hydroxy-nitro-benzene-sulfochlorides. These chlorides are heated with hydroxy compounds in the presence of zinc dust to form sulfonic acid esters which must be catalytically reduced. The o-hydroxy-amino-benzene-sulfonic acid esters obtained may be converted into the diazo compounds in the usual manner. Another method is to prepare sulfonic acid chlorides from benzoquinone-(1,2)-diazide-sulfonic acids by treatment with chlorosulfonic acid and react them with hydroxy compounds in an alkaline medium whereby sulfonic acid esters are formed.

It is of advantage to select the residues, which are introduced into the molecule by esterification, so that the diazo compounds formed are either of low solubility or insoluble in water. The printing properties of these groups of quinone-diazides may be further improved by the introduction of more substituents, preferably hydrocarbon radicals, into the benzene nucleus. Derivatives with a substituent in the 6-position of the benzene nucleus are of special advantage.

The following examples are inserted merely for the purpose of illustrating the above described process without any intention of restricting the scope of the invention.

*Examples*

(1) An aluminum foil, mechanically roughened on its surface, is coated on one side with a 2% solution of the diazo compound of Formula 1 obtained from 2-amino-1-hydroxy-benzene-4-sulfonic acid-phenylester in ethyleneglycolmonomethyl ether. After exposure to light under a positive master there is obtained an image which is wiped over several times with a 2% solution of trisodium phosphate, washed with water and then treated with a 1% aqueous solution of phosphoric acid in order to serve as a positive printing plate. After removing the excess acid with the aid of tampons the foil is dried for about half a minute in a drying closet heated to 250° C., whereby the greenish yellow color of the image changes to a brown-yellow shade. The diazo compound is prepared in the following manner:

(*a*) 22 g. of 2-nitro-1-hydroxy-benzene-4-sulfonic acid are triturated and mixed quickly with 21 g. of phosphorus pentachloride and heated on the oil bath to 120° C. for two hours while humidity is excluded. The cooled content of the retort is digested with icy water and the oily 2-nitro-1-hydroxy-benzene-4-sulfochloride is dissolved in ether. The ether solution, which is washed several times by shaking with water and then dried with anhydrous sodium sulfate, is evaporated at reduced pressure. The remaining sulfochloride is a thickly flowing, weakly yellow colored sirup. Yield 13 g.

(*b*) 15 g. of 2-nitro-1-hydroxy-benzene-4-sulfochloride (raw product) are heated on the oil bath together with a mixture of 6.2 g. of phenol and 2.4 g. of zinc dust. The temperature is slightly raised to about 130° C. and the reaction takes place instantaneously and very intensively. The dark brown melt is digested with water and ether after cooling and is then filtered. The ether layer, which contains the 2-nitro-1-hydroxy-benzene-4-sulfonic acid phenylester, is separated from the aqueous layer and washed with water several times. Thereafter it is dried over anhydrous sodium sulfate and the ether is distilled off at reduced pressure. After being recrystallized from very little methanol (with addition of charcoal) the brownish colored, raw sulfonic acid phenylester forms weakly brown colored iridescent small needles. Yield 2.1 g. Melting point 101° C.

(*c*) 6 g. of the 2-nitro-1-hydroxy-benzene-4-sulfonic acid-phenylester are dissolved in 500 cc. of alcohol and, after the addition of about 15 g. of Raney-nickel, reduced catalytically in an autoclave at 50–60° C. The alcoholic solution is filtered off from the nickel catalyst (nickel contact produced according to Raney) and evaporated to dryness. By the addition of some aqueous sodium chloride solution and some 16% hydrochloric acid, until a reaction takes place on Congo-paper, the hydrochloride of the 2-amino-1-hydroxy-benzene-4-sulfonic acid phenylester separates out as a white crystalline precipitate. Yield 3 g.

(*d*) 3 g. of this hydrochloride of 2-amino-1-hydroxy-benzene-4-sulfonic acid phenylester are dissolved in 70 cc. of water with the addition of 5 cc. of 32% hydrochloric acid. In order to purify this solution it is treated with charcoal when hot. 10 cc. of a 2n-solution of sodium nitrite are dropped into the solution which has cooled down to 10° C. The diazo compound obtained from the 2-amino-1-hydroxy-benzene-4-sulfonic acid phenylester precipitates as a water-insoluble yellow substance. Yield 1.7 g. On heating it turns red at 110° C. and melts at 125° C. with decomposition and blackening.

Equally good results are obtained with the diazo compound of Formula 2 obtained from the 2-amino-1-hydroxy-benzene-4-sulfonic acid-($\beta$)-naphthylester.

The 2-nitro-1-hydroxy-benzene-4-sulfonic acid-($\beta$)-naphthylester, which is prepared analogously to the phenylester, melts at 179°–182° C. The amino compound obtained therefrom by catalytical reduction is isolated in the form of the crystallized hydrochloride. The diazo compound melts at about 120° C. while charing.

Instead of the diazo compound of Formula 1 the diazo compound listed as Formula 3 may be used with the same result.

In preparing the diazo compound conforming to Formula 3, benzoquinone-(1,2)-diazide-(2)-4-sulfo-acid is heated together with the fourfold quantity of chlorosulfonic acid to a temperature of 60° C. and is thus converted into benzoquinone-(1,2)-diazide-(2)-4-sulfochloride. The latter, subsequent to its recrystallization from a mixture of dioxane and water, melts at a temperature of 109° C. under decomposition.

To 2.2 moles of benzoquinone-(1,2)-diazide-(2)-4-sulfochloride in dioxane a solution of 1 mole of 4,4′-dihydroxy-diphenyl in dioxane is added in the presence of pyridine. After the solvent has been distilled off at low temperature and at reduced pressure and after the solid residue has been digested with water for some time, O,O′-di-[benzoquinone-(1″,2″)-diazide-(2″)-4″-sulfonyl]-4,4′-dihydroxy-diphenyl is obtained in the form of a brown colored powder. When heated in a capillary tube, the compound starts charring at about 150° C. with slow simultaneous decomposition.

This compound can also be used in a negative process. A 2% solution of the diazo compound conforming to Formula 3 in glycol monomethyl ether is applied to an aluminum foil as described above. The layer is thoroughly dried in a current of hot air and subsequently is exposed to light under a negative pattern. The development of the image thus produced is effected with a solution of 20 cc. of triglycol in 80 cc. of water. Then the plate is briefly treated once more with a 1% solution of phosphoric aicd, and, subsequent to inking with greasy ink, can be used for printing.

(2) An aluminum foil is coated with a 2% solution of the diazo compound conforming to the Formula 4 in ethylene glycol monomethyl ether. The solvent is removed from the layer by intensely drying the latter with a hot-air apparatus. After the sensitized foil has been exposed to light behind a transparent positive master, the foil is developed by wiping it over with a 1–2% aqueous trisodium phosphate solution. Subsequent to its being rinsed with water and then briefly wiped with a 1% solution of phosphoric acid, the image is inked with greasy ink. A positive printing plate is thus obtained.

In preparing the diazo compound conforming to Formula 4, 5-methyl-benzoquinone-(1,2)-diazide-(2)-4-sulfo acid is converted by the action of chloro-sulfonic acid into the corresponding sulfo-acid-chloride which, when recrystallized from a dioxane water mixture, melts at a temperature of 111° C. under decomposition.

2.2 moles of the sulfochloride, dissolved in dioxane, are introduced drop by drop into a solution of 1 mol of 4,4′-dihydroxy-diphenyl-sulfone in a water-dioxane mixture containing the necessary quantity of soda. The O,O′-di-[5″-methyl-benzoquinone-(1″,2″)-diazide-(2″)-4″-sulfonyl]-4,4′-dihydroxy-diphenyl-sulfone initially separates in the form of a brown oil and then solidifies very quickly in a crystalline form. It can be recrystallized from a mixture of glacial acetic acid and water, and slowly chars above 200° C. on heating in a capillary tube, no melting occurs.

Instead of the diazo compound of Formula 4 the diazo compound listed as Formula 5 may be used with the same result. For the preparation of said diazo compound of Formula 5, 2.6 parts by weight of 4,4′,dihydroxydiphenyl-sulfone are dissolved in a mixture consisting of 20 parts by volume of dioxane and 38 parts by volume of a 7.4% sodium carbonate solution. To this solution there is added drop by drop and while agitating a solution of 4.8 parts by weight of benzoquinone-(1,2)-diazide-(2)-sulfochloride, the preparation of which has been described in Example 1, in 25 parts by vol. of dioxane. O,O′-di-[benzoquinone-(1″,2″)-diazide-(2″)-4″-sulfonyl]-4,4′-dihydroxy-diphenyl-sulfone is formed, which precipitates as a yellow-brown substance. The compound is recrystallized from glacial acetic acid. If heated in a capillary tube, it chars without melting.

(3) 2 parts by weight of the diazo compound corresponding to Formula 6 and 1 part by weight of a formaldehydephenol-resin-novolak sold in Germany by the firm "Chemische Werke Albert" at Wiesbaden-Biebrich (Germany) under the name "Alnovol" (registered trademark in Germany) are dissolved in 100 parts by vol. of ethylene glycol monomethyl ether. A mechanically roughened aluminum foil is coated with this solution by means of a whirler and then dried with a current of warm air. For complete removal of the solvent the foil is subsequently dried for 5 minutes at 90° C. The light-sensitive layer is then exposed to light under a positive transparent original, e.g. for 1 minute at a distance of 70 cm. from an arc lamp of 18 amps. The exposed layer is then developed with a 1% aqueous solution of trisodium phosphate and is shortly wiped over with 1% phosphoric acid. The positive image obtained may be inked with greasy ink and used as a printing plate. A positive plate is obtained from a positive original.

The diazo compound corresponding to Formula 6 is prepared as follows:

0.67 part by weight of 1,1-di-(4′-hydroxy-phenyl)-cyclohexane are dissolved in a mixture consisting of 8 parts by vol. of dioxane and 10 parts by vol. of a 6% sodium carbonate solution. To this solution there is added, while agitating and at a temperature of 40° C., a solution of 1.3 parts by weight of benzoquinone-(1,2)-diazide-(2)-4-sulfochloride in 5 parts by vol. of dioxane. The di-ester formed of the above-mentioned di-hydroxy-compound and the benzoquinone-(1,2)-diazide-(2)-4-sulfonic acid precipitates first in the form of an oil, which becomes crystalline upon triturating with water. Upon heating in a capillary tube the diazo compound burns. No definite melting point could be stated.

(4) 1.5 parts by weight of the diazo compound corresponding to Formula 7 are dissolved in 100 parts by volume of ethylene glycol monomethyl ether. One side of a mechanically roughened aluminum foil is coated with this solution by means of a plate-whirler. The foil is dried first with a current of warm air having a temperature of about 60° C., and then, for complete removal of the solvent, for two minutes in a drying oven of 100° C. Subsequently the sensitized aluminum foil is exposed for about 60 seconds under a positive transparent original, using e.g. as light source an arc lamp of 18 amps. at a distance of 70 cm. The latent image thus produced is developed by swabbing with a 1% trisodium phosphate solution. After shortly rinsing with water the image side of the foil is treated with 1% phosphoric acid and then inked with greasy ink. From a positive original a positive printing plate is obtained.

The diazo compound corresponding to Formula 7 is prepared as follows:

7 parts by weight of benzoquinone-(1,2)-diazide-(2)-4-sulfochloride are dissolved in 50 parts by volume of dioxane. This solution is mixed with another solution containing 4.3 parts by weight of 3-hydroxy-diphenylene oxide in 25 parts by volume of dioxane. To this mixture there is added drop by drop and while agitating, a solution of 1.8 parts by weight of sodium carbonate in 25 parts by volume of water. The reaction mixture is allowed to stand for one night. It is then diluted by adding 100 parts by volume of water, whereupon the reaction product precipitates. This is sucked off and purified by dissolving it in dioxane and then reprecipitating by adding water. The diazo compound corresponding to Formula 7 is yellow colored and melts at about 145° C.

This application is a continuation-in-part of application Serial No. 472,224, filed November 30, 1954, which, in turn, is a continuation-in-part of application Serial No. 238,369, filed July 24, 1951, and now abandoned.

What is claimed is:

1. A compound having the formula

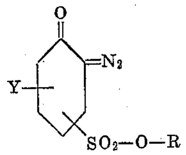

in which R is an aryl group, and Y is selected from the group consisting of hydrogen and lower alkyl radicals.

2. A compound having the formula

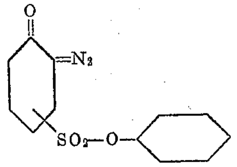

3. A compound having the formula

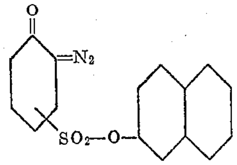

4. A compound having the formula

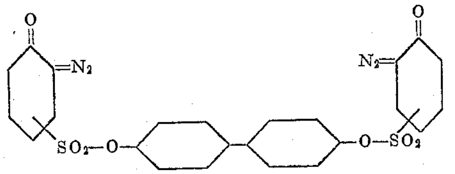

5. A compound having the formula

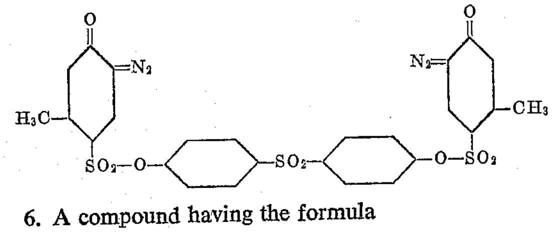

6. A compound having the formula

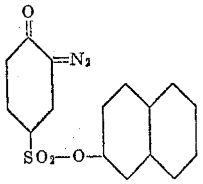

7. A compound having the formula

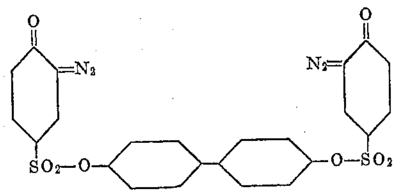

8. A compound having the formula

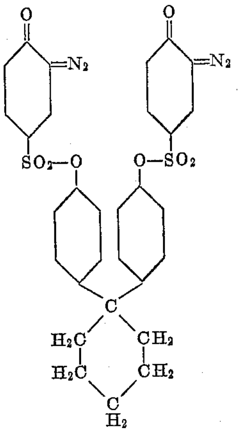

9. A compound having the formula

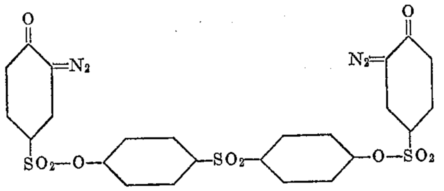

10. A presensitized printing plate comprising a base material having a coating thereon comprising a compound having the formula

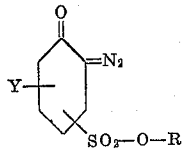

in which R is an aryl group, and Y is selected from the group consisting of hydrogen and lower alkyl radicals.

11. A presensitized printing plate comprising a base material having a coating thereon comprising a compound having the formula

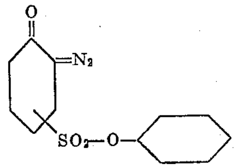

12. A presensitized printing plate comprising a base material having a coating thereon comprising a compound having the formula

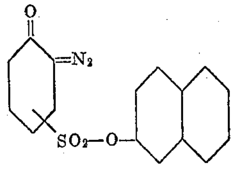

13. A presensitized printing plate comprising a base material having a coating thereon comprising a compound having the formula

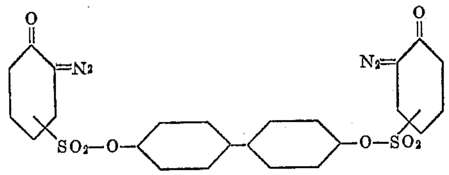

14. A presensitized printing plate comprising a base material having a coating thereon comprising a compound having the formula

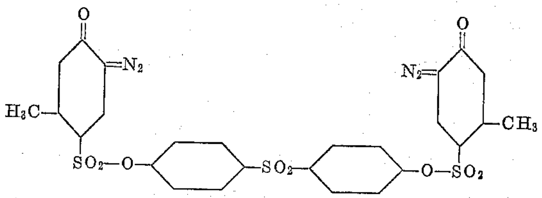

15. A presensitized printing plate comprising a base material having a coating thereon comprising a compound having the formula

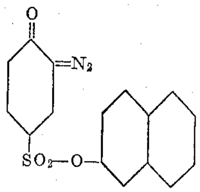

16. A presensitized printing plate comprising a base material having a coating thereon comprising a compound having the formula

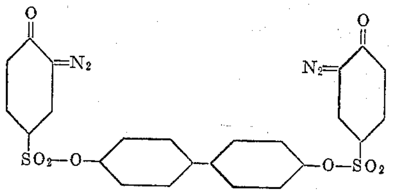

17. A presensitized printing plate comprising a base material having a coating thereon comprising a compound having the formula

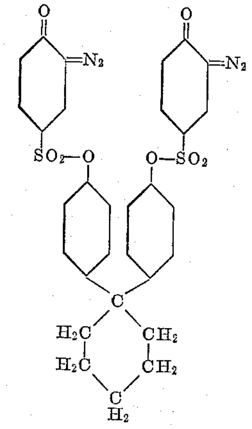

18. A presensitized printing plate comprising a base material having a coating thereon comprising a compound having the formula

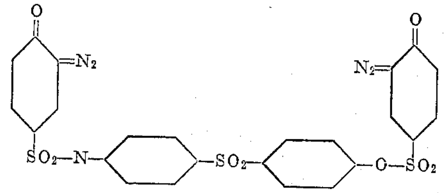

19. A process for developing a printing plate which comprises exposing to light under a master a plate having a compound thereon of the formula

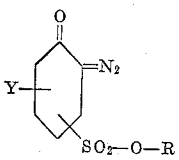

in which R is an aryl group and Y is selected from the group consisting of hydrogen and lower alkyl radicals; to thereby form a decomposition product in the light struck areas and removing the decomposition product by treatment with a weakly alkaline solution.

20. A process for developing a printing plate which comprises exposing to light under a master a plate having a compound thereon of the formula

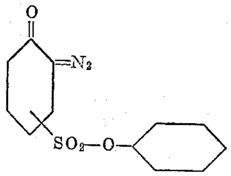

to thereby form a decomposition product in the light struck areas and removing the decomposition product by treatment with a weakly alkaline solution.

21. A process for developing a printing plate which comprises exposing to light under a master a plate having a compound thereon of the formula

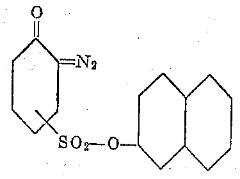

to thereby form a decomposition product in the light struck areas and removing the decomposition product by treatment with a weakly alkaline solution.

22. A process for developing a printing plate which comprises exposing to light under a master a plate having a compound thereon of the formula

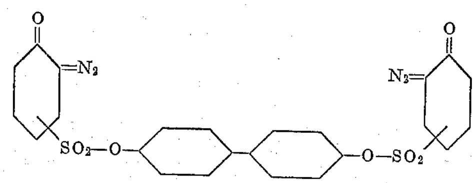

to thereby form a decomposition product in the light struck areas and removing the decomposition product by treatment with a weakly alkaline solution.

23. A process for developing a printing plate which comprises exposing to light under a master a plate having a compound thereon of the formula

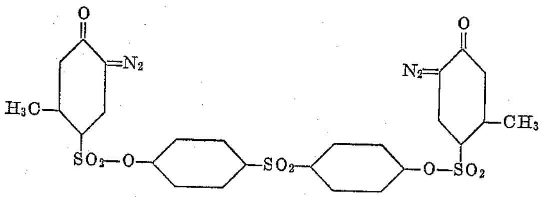

to thereby form a decomposition product in the light struck areas and removing the decomposition product by treatment with a weakly alkaline solution.

24. A process for developing a printing plate which comprises exposing to light under a master a plate having a compound thereon of the formula

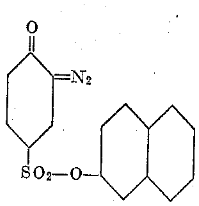

to thereby form a decomposition product in the light struck areas and removing the decomposition product by treatment with a weakly alkaline solution.

25. A process for developing a printing plate which comprises exposing to light under a master a plate having a compound thereon of the formula

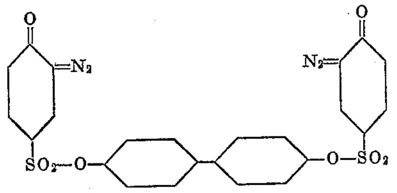

to thereby form a decomposition product in the light struck areas and removing the decomposition product by treatment with a weakly alkaline solution.

26. A process for developing a printing plate which comprises exposing to light under a master a plate having a compound thereon of the formula

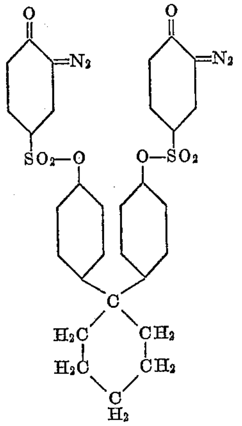

to thereby form a decomposition product in the light struck areas and removing the decomposition product by treatment with a weakly alkaline solution.

27. A process for developing a printing plate which comprises exposing to light under a master a plate having a compound thereon of the formula

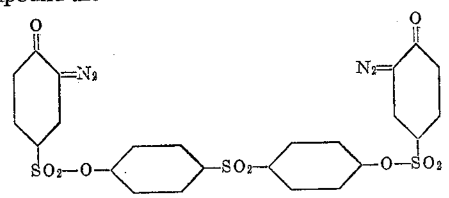

to thereby form a decomposition product in the light struck areas and removing the decomposition product by treatment with a weakly alkaline solution.

28. A compound having the formula:

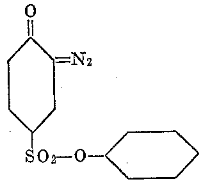

29. A compound having the formula:

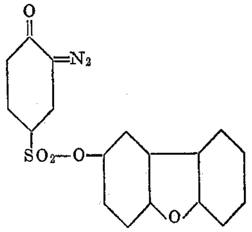

30. A presensitized printing plate according to claim 10 in which the coating contains an alkali-soluble resin.

31. A process according to claim 19 in which the compound is in admixture with an alkali-soluble resin.

References Cited in the file of this patent

UNITED STATES PATENTS

| | | |
|---|---|---|
| 2,702,243 | Schmidt | Feb. 15, 1955 |

FOREIGN PATENTS

| | | |
|---|---|---|
| 497,135 | Belgium | Aug. 14, 1950 |
| 871,668 | Germany | Mar. 26, 1953 |
| 888,204 | Germany | Aug. 31, 1953 |